Jan. 20, 1953  D. A. MACRO  2,626,056
OIL FILTER
Filed Feb. 14, 1951  2 SHEETS—SHEET 1

David A. Macro
INVENTOR.

BY
*Clarence A. O'Brien*
*and Harvey B. Jackson*
Attorneys

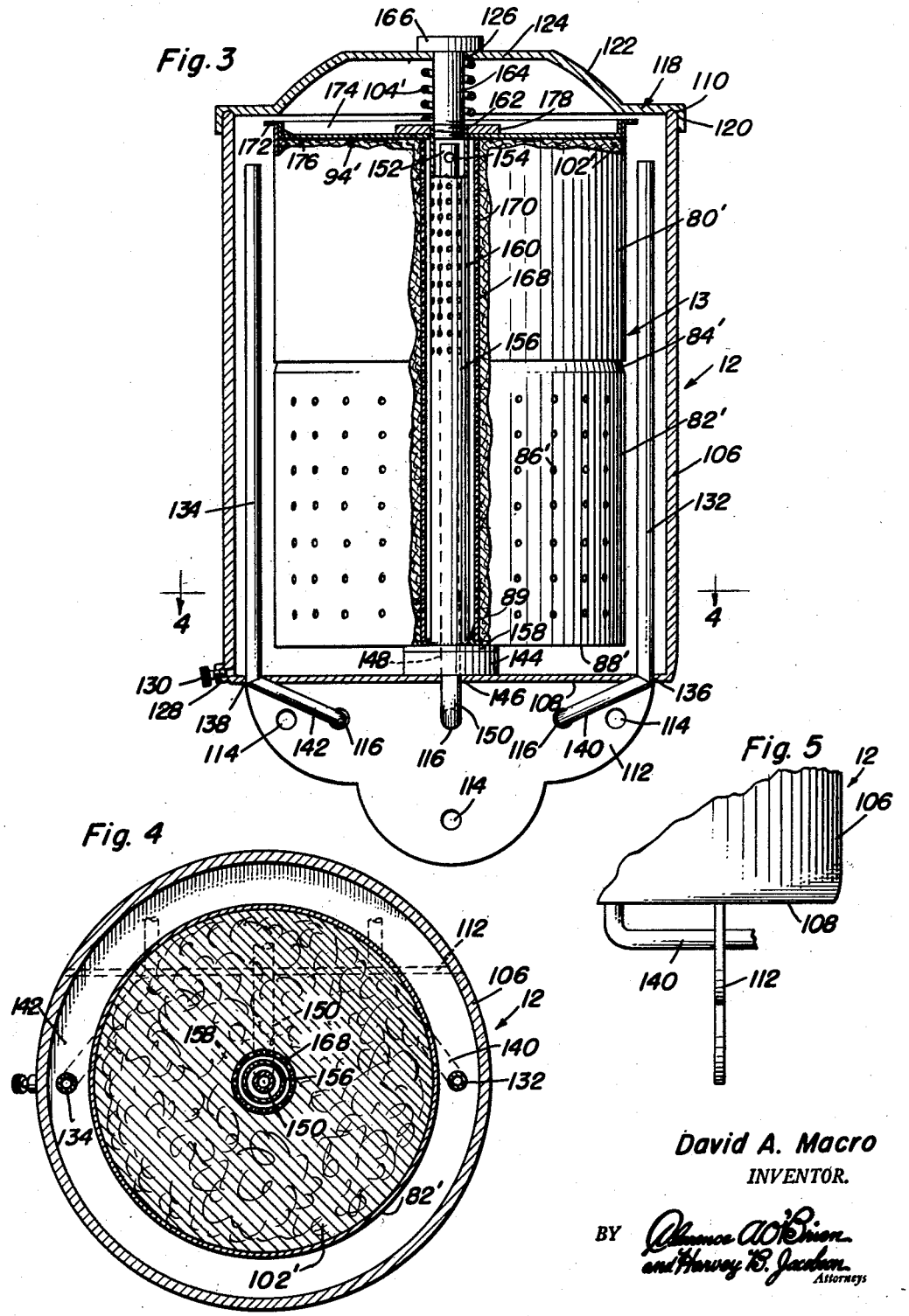

Patented Jan. 20, 1953

2,626,056

UNITED STATES PATENT OFFICE 2,626,056

OIL FILTER

David A. Macro, Sheridan, N. Y.

Application February 14, 1951, Serial No. 210,854

1 Claim. (Cl. 210—131)

The present invention relates to improvements in filters and more particularly to oil filters adapted for use in the oil system of an internal combustion engine.

An object of the present invention is to provide an oil filter unit which is of such construction that the same may be readily applied to use in combination with internal combustion engines and wherein the oil filter is constructed for ready removal of the filter material whereby the filter material may be replaced after a predetermined amount of use.

A further object of the present invention resides in the provision of an oil filter unit wherein the filtering material is readily removable and replaceable and wherein the structure of the oil filter unit is not of the expandable type, as in previous oil filters wherein cartridges of the replaceable type were employed for insertion and removal when necessary.

Still another object of the present invention resides in the novel construction of the oil filter unit whereby the oil must necessarily travel through a tortuous path within the filter unit and also pass through the filter material along longitudinal lines rather than along radial lines as in filter cartridges of present-day use.

Still another object of the present invention is to provide an oil filter unit wherein the casing is provided with a removable cover and a filter means within the casing, the filter means including a cylindrical assembly receiving filter material therein, and wherein the filter means is of the construction that can be inverted when it is desired to alter the flow through the filter material so that a less tortuous path is provided.

Various other objects and advantages will become apparent from the detailed description to follow. The best forms in which I have contemplated applying my invention are clearly illustrated in the accompanying drawings, wherein:

Figure 3 is a vertical sectional view through the casing of a modified form of oil filter and showing the filter means mounted therein with parts broken away;

Figure 4 is a horizontal detail sectional view taken substantially along the plane of line 4—4 of Figure 3; and Figure 5 is a detail side elevational view of a portion of the filter unit of Figure 3 and showing the attaching bracket secured to the underside of the casing.

Figure 1:
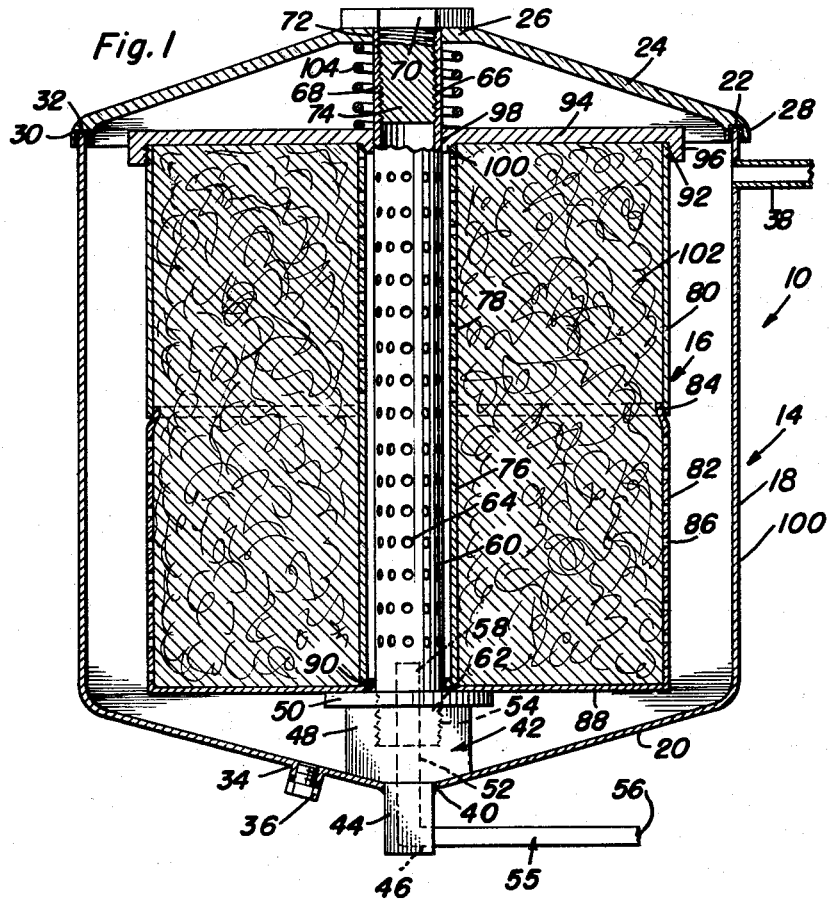
Figure 1 is a vertical sectional view through a first form of oil filter.

Referring more particularly to the drawings, wherein like numerals designate like parts throughout, the numeral 10 designates generally a first form of filter unit while the numeral 12 designates a second form of filter unit, the two forms of units being shown in Figures 1 and 3, respectively.

The form of filter shown in Figure 1 is comprised of a casing 14 and a filter means 16 mounted therein. The casing 14 is comprised of a substantially cylindrical wall 18 having a conical bottom wall 20 and an open upper end at 22. A closure cap 24, of conical form, and having a flat top at 26, has a peripheral flange portion 28 which is annularly recessed at 30 for engagement with the upper end 22 of the cylindrical wall 18. The recess 30 is provided with a seal of annular form 32, whereby engagement between the closure cap 24 and cylindrical wall 18 will prevent leakage of oil from the casing 14.

The bottom wall 20 of the casing 14 is formed with an opening at 34 in which is received a drain plug 36 whereby draining of the oil from the casing and flushing of the casing can be accomplished. The cylindrical wall 18 is formed with a tubular outlet 38 which is adjacent its upper edge 22.

The bottom wall 20 is formed with an opening at 40 and a bushing member 42 has its reduced diameter portion 44 extending through the opening 40 and formed with the L-shaped bore 46. The enlarged portion 48 of the bushing 42 terminates in a flanged portion at 50 and has a bore 52 therethrough in communication with the L-shaped bore 46. The enlarged portion 48 is also formed with a counterbore at 54 which is also internally threaded. An L-shaped inlet pipe, which may be comprised of a pair of pipes, extends through the bores 52 and 46 of the bushing member 42 and has its outer end 56 adapted to be connected to an oil line of the lubricating system of the internal combustion engine. The inner end 58 of the pipe 55 terminates within the casing 14 immediately above the flange portion 50 of the bushing member 42.

A tubular member 60 having a lower exteriorly threaded end 62 is threadably engaged within the counterbore 54 of the bushing member 42 and is disposed in upstanding relation within the casing 14 of the filter unit. The tube 60 is formed with a plurality of apertures 64 which extend substantially throughout its entire length.

The upper imperforate end 66 of the tube 60 is internally threaded at 68 and an attaching plug 70 is disposed through an opening 72 in the closure cap 24 and has its reduced diameter exteriorly threaded portion 74 received within the internally threaded portion of the tube 60 at 68.

The filter means 16 is comprised of a tubular core 76 having a plurality of apertures 78 formed throughout one-half of its length and at the upper portion thereof. The other cylindrical wall of the filter means 16 includes upper and lower sections 80 and 82, the lower wall section 82 having an offset portion at 84 whereby the upper wall section 80 can be received thereon to provide a unitary outer cylindrical wall. The lower wall section 82 is also formed with a plurality of openings 86 and has a unitarily formed horizontally extending bottom wall 88 interconnecting the tube 76 with the outer cylindrical wall at the bottom thereof. The bottom wall 88 is apertured and has an upturned flange 90 surrounding the opening for engagement with the lower end portion of the tube 76.

The upper wall section 80 is exteriorly threaded at 92 and a disk-like cover 94 has a downwardly extending flange 96 at its outer periphery for engagement with the exteriorly threaded portion 92 of the wall section 80. The central portion of the cover 94 is apertured at 98 for slidable engagement with the tube 60 and has an annular boss 100 in engagement with the upper end of the tubular core 76. A filtering material 102 is disposed between the tubular core 76 and the outer cylindrical wall sections 80 and 82.

As shown in Figure 1, the flow through the oil filter device will be from the inlet pipe 55 into the tube 60 and out through the apertures 64 therein. The oil will then pass through the aperture 78 formed in the upper part of the tubular core 76, down through the filter material 102 and out through the apertures 86 in the lower wall section 82. The filtered oil will then pass through the outlet 38 for the re-circulation in the system.

Figure 2:
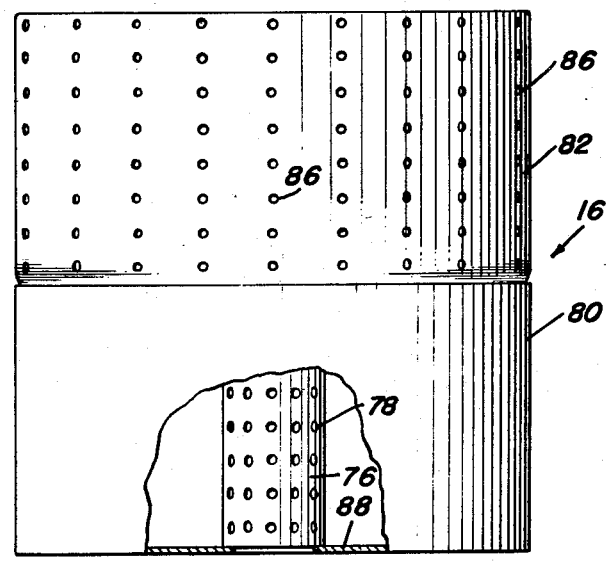
Figure 2 is a side elevational view of the filter means of the oil filter of Figure 1, but wherein the filter means is in inverted position for reinsertion into the casing of the filter unit for a modified flow through the casing, with parts broken away.

Figure 2 shows the filtering means 60 in inverted position with the apertured lower wall section 82 above the upper wall section 80. Similarly, the tubular core 76 is in inverted position with the apertures 78 at the lower end of the filter means. Thus, flow from the outlet end 58 of the inlet pipe 55 will be through the apertures 64 in the tube 60, through the apertures 78 adjacent the bottom end of the tube 60, up through the filter means 102 and out through the apertures 86 in the wall section 82 and from there to the outlet 38 for re-circulation.

In assembling the filter device, the filter means 16 is provided with unused filter material 102 and the closure 94 is secured thereon. The filter means 16 is then inserted into the casing 14 and receives the tube 60 therethrough. A coil compression spring 104 is engaged about the tube 60 and abuts the closure 94 of the filter means 16. The cap 24 is then placed over the upper edge of the cylindrical wall 18 and the attaching plug 70 is threadably engaged within the tube 60 to provide a fuel unit.

Looking now at Figures 3 through 5, it will be seen that the modified form of filter device 12 is comprised of a cylindrical casing 106 having a flat bottom wall 108 and an open upper end 110. An attaching bracket 112 is secured to the underside of the bottom wall 108 and is perpendicular thereto. The attaching bracket 112 has a plurality of apertures 114 therethrough whereby the filter device 12 can be secured to a preselected portion of the internal combustion engine. The attaching bracket 112 has further apertures 116 which are adapted to receive portions of pipes extending therethrough.

A closure cap 118 is provided for the open upper end 110 of the cylindrical wall 106 and has a downwardly extending annular flange portion 120 engaged over the upper outer periphery of the cylindrical wall 106. The central portion of the cap 118 is raised at 122 and has a flat circular portion 124 apertured at 126. The casing is also provided with an opening adjacent the bottom wall 108 at 128 which is selectively closed by the closure plug 130 whereby the casing can be drained or flushed when needed.

A pair of inlet pipes 132 and 134 are vertically disposed adjacent the cylindrical wall 106 at opposite sides thereof and have their lower ends extending through apertures 136 and 138 formed in the bottom wall 108. Extension portions 140 and 142 of the pipes 132 and 134 extend through the openings 116 in the attaching bracket 112 whereby the two inlet pipes can be supplied with oil from the lubricating system of the internal combustion engine.

The bottom wall 108 has a bushing element 144 centrally disposed thereon and overlying the aperture 146 which is in alignment with the bore 148 of the bushing element 144. An outlet pipe 150 has its lower end extending through one of the openings 116 in the attaching bracket 112 for connection with the lubrication system for return of the filtered oil. The pipe 150 extends through the bore 148 in the bushing element 144 and terminates adjacent the upper end of the casing. The upper end 152 of the outlet pipe 150 is formed with a pair of opposed openings 154 for the return flow of oil into the outlet pipe.

A sleeve or tube 156 has its lower end integrally formed with a flange 158 which is engaged on the bushing element 144 for support thereby. The sleeve 156 receives the outlet pipe 150 therethrough and has its upper half formed with a plurality of apertures 160. The uppermost end of the sleeve 156 is internally threaded at 162. A plug 164 is inserted through the opening 126 and has its enlarged head 166 overlying the mouth of the opening 126. The lower end of the attaching plug 164 is internally threaded into the upper threaded end 162 of the sleeve 156.

The filtering means 13 of the oil filter 12 is similar to the filter means 16 of the oil filter 10 and is comprised of a lower cylindrical wall section 82' having a plurality of openings 86' formed therein. A tubular core 168 has a plurality of openings 170 formed throughout its length and has its lower end supported on the bottom wall 88', integrally formed with the bottom wall section 82'. As in the form shown in Figure 1, the bottom wall 88' is apertured and has an upturned flange 89.

The filter means 13 also has an upper wall section 80' which is engaged over the reduced diameter portion 84' of the lower wall section 82'. The cap 94' is of disk form and has an annular flange portion 172 integrally formed with the dish portion 174. The dish portion 174 has its upstanding walls 176 slidably engaged within the upper inner periphery of the upper wall section 80'. The central portion of the cap 94' is apertured and has an annular element 178 secured thereto. The cap 94' and annular element 178 are received about the upper end of the sleeve 156 and the compression spring 104' is engaged between the closure 118 and the annular element 178 for normally urging the filtering means 13 into engagement with the flange 158. Thus, the entire filtering means 13 can be removed upon removal of the closure 118 from the casing of the oil filter unit.

As will be seen from a consideration of Figures 3 through 5, dirty oil from the engine will flow to the inlet pipes 140 and 142 and will overflow their upper ends into the annular space between the upper wall section 80' and the cylindrical wall 106 of the casing. The oil will flow downwardly and into the apertures 86' of the lower wall section 82'. The oil will then flow through the filter material 102', upwardly, and radially inwardly, through the apertures 170 of the tubular core 168. The oil must then flow upwardly for entrance through the openings 160 of the sleeve 156 and from there passes through the outlet openings 154 and down through the outlet pipe 150 for re-circulation in the lubricating system of the internal combustion engine.

In view of the foregoing, it is believed that a device has been provided which will accomplish all of the objects hereinabove set forth.

Having described the invention, what is claimed as new is:

An oil filter comprising a cylindrical container including a bottom and a removable closure, a vertical tube mounted centrally in said container and having a perforated upper portion, an outlet pipe, mounted in the tube in spaced relation thereto, a cylindrical cartridge removably mounted in the container and spaced concentrically therefrom for defining an annular chamber, said cartridge including a shell comprising a perforated lower portion and an imperforate upper portion and further including a perforated core enclosing the tube in spaced, concentric relation thereto, and vertical inlet pipes in the chamber adjacent diametrically opposite sides of the container, said outlet and inlet pipes entering the container through the bottom and terminating in the upper portion of said container.

DAVID A. MACRO.

REFERENCES CITED

The following references are of record in the file of this patent:

UNITED STATES PATENTS

| Number | Name | Date |
| --- | --- | --- |
| 2,110,318 | Baruch | Mar. 8, 1938 |
| 2,122,310 | Burt | June 28, 1938 |
| 2,165,703 | Holmes | July 11, 1939 |
| 2,337,238 | Griffith | Dec. 21, 1943 |
| 2,347,384 | Winslow et al. | Apr. 25, 1944 |
| 2,357,572 | Baldwin | Sept. 5, 1944 |
| 2,511,800 | Wilkinson | June 13, 1950 |